United States Patent [19]

Takezoe et al.

[11] Patent Number: 4,500,953
[45] Date of Patent: Feb. 19, 1985

[54] DATA TRANSFER ABNORMALITY PROCESSING SYSTEM

[75] Inventors: Fumihiko Takezoe; Junichi Fujii, both of Tokyo, Japan

[73] Assignees: Fuji Facom Corporation, Tokyo; Fuji Electric Company Limited, Kanagawa, both of Japan

[21] Appl. No.: 276,549

[22] Filed: Jun. 23, 1981

[30] Foreign Application Priority Data

Jun. 27, 1980 [JP] Japan ................................. 55-86653

[51] Int. Cl.³ .......................... G06F 9/00; G06F 13/00
[52] U.S. Cl. .................................................... 364/200
[58] Field of Search ... 364/900 MS File, 200 MS File

[56] References Cited

U.S. PATENT DOCUMENTS

| 3,815,099 | 6/1974 | Cohen et al. | 364/200 |
| 4,236,203 | 11/1980 | Curley et al. | 364/200 |
| 4,300,194 | 11/1981 | Bradley et al. | 364/200 |

*Primary Examiner*—Gareth D. Shaw
*Assistant Examiner*—John G. Mills
*Attorney, Agent, or Firm*—Sughrue, Mion, Zinn, Macpeak & Seas

[57] ABSTRACT

A data processing system including a data transfer abnormality processing unit in which delays caused by the production of a data transfer abnormality signal during a data transfer cycle period are eliminated. A bus controller, a memory unit and one more data processing units are connected in parallel to a common bus which includes a data transfer abnormality signal line. The bus controller includes a data register which receives data from the common bus, delaying it for one cycle period before applying it to a transfer abnormality check circuit. The transfer abnormality signal produced by the transfer abnormality check circuit is stored in a transfer abnormality setting flip-flop in each data processing circuit with a clock pulse which is produced delayed with respect to a bus use permission signal.

5 Claims, 9 Drawing Figures

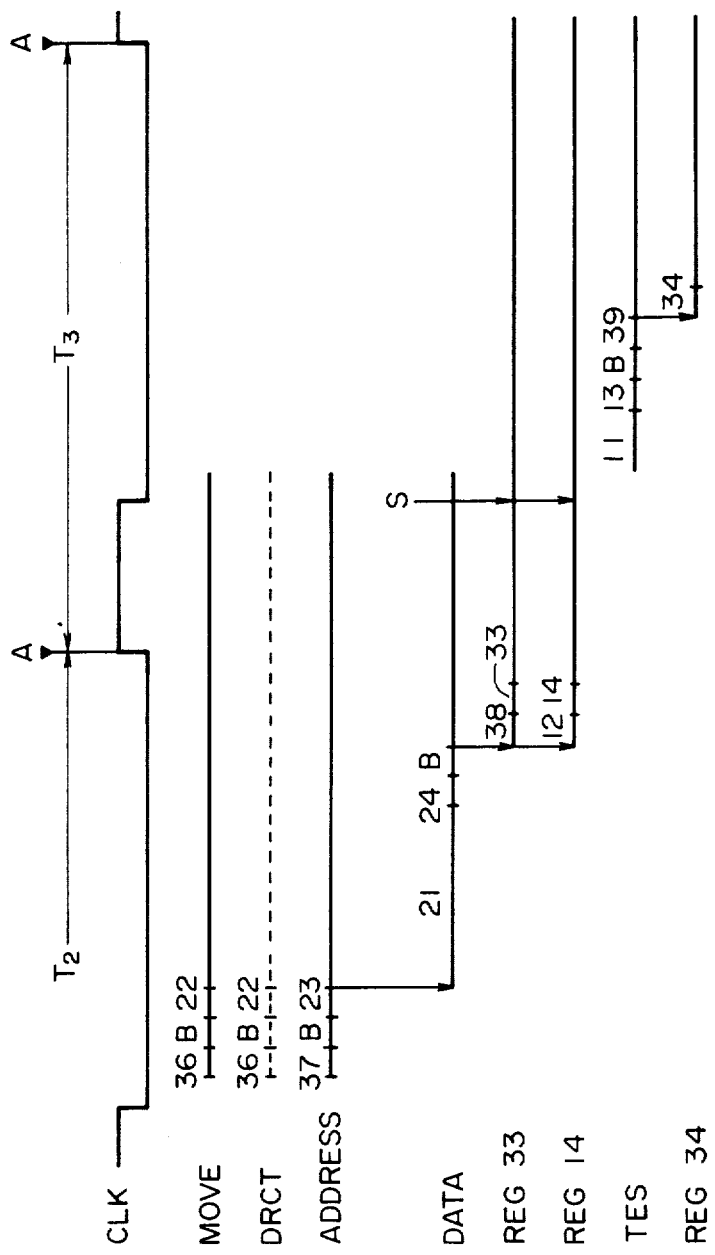

DATA TRANSFER ABNORMALITY PROCESSING SYSTEM

BACKGROUND OF THE INVENTION

The present invention relates to a data transferring system in a data processing system in which a bus controller, a memory unit and a plurality of data processing units are connected in parallel on a common bus having data lines and a control signal line, and data is transferred between the data processing units and the memory unit or between data processing units under the control of the bus controller. More particularly, the invention relates to a system of detecting and processing data transfer abnormalities such as parity errors.

FIG. 1A is a block diagram of a prior art data processing system of this general type.

In FIG. 1A, reference numeral 1 designates a bus controller which controls the right of use of a bus B, supplies a clock signal and conducts a transfer abnormality detecting operation such as a parity check. Reference numeral 2 designates a memory unit connected to the bus B, and reference numerals $3_1, 3_2, \ldots 3_i \ldots 3_n$ designate data processing units. The common bus B is constituted by data lines for transmitting data between these units and control signal lines for transmitting various signals other than data.

FIG. 2A is a connection diagram showing the elements of FIG. 1A in more detail. Only one data processing unit is shown in FIG. 2A; however, it should be noted that, similar to FIG. 1A, a plurality of data processing units are provided. The common bus control of the bus controller is not related directly to the invention, and therefore its specific arrangement will not be described.

In FIG. 2A, reference numeral 1 designates the bus controller, 11 a transfer abnormality check circuit, 12 a data signal receiver, 13 a transfer abnormality signal transmission driver, 2 the memory unit, 21 a memory element, 22 a drive signal receiver, 23 an address receiver, 3 the data processing unit, 31 a transfer control circuit, 32 an address register, 33 a data register, 34 a transfer abnormality setting flip-flop, 35, 38 and 39 receivers, and 36 and 37 drivers.

FIG. 1B is a timing chart showing the operation of the data processing unit wherein the data processing unit reads data out of the memory unit. In FIG. 1B, reference character CLK designates a synchronizing clock pulse for data transfer, the clock pulse being supplied from the bus controller 1 to the data processing unit 3 or to the memory unit 2 as the case may be. BRQ designates a signal provided when the data processing unit 3 makes a request for the use of the bus to the bus controller 1, GRT a bus use permission signal which is applied to the data processing unit 3 from the bus controller 1, MOVE a data transfer operation indication signal which is applied from the data processing unit 3 to the bus controller 1 and the memory 2, DRCT a transfer direction indication signal which is outputted by the signal MOVE (the dotted line designating that the transfer direction is from the memory unit to the data processing unit), and ADDRESS an address signal for the memory unit 2 which is outputted by the data processing unit 3 with the same timing as the signal MOVE. These signals are supplied through the control signal lines of the common bus.

Further in FIG. 1B, reference character DATA designates a data signal read out of the memory unit 2, TES a transfer abnormality signal which is subjected to decision by the bus controller 1 according to the data signal read out of the memory unit 2, REG a signal of the data register 33 (shown in FIG. 2A only) which is generated in the data processing unit and used for storing data read out of the memory unit 2, and FF a signal from the flip-flop 34 for storing data transfer abnormalities.

FIG. 2B is a timing chart showing in more detail the conditions of various signals during the period of time $T_2$ in FIG. 1B. In FIG. 2B and FIG. 1B, like signals are designated by like reference characters or numerals.

In FIG. 2B, lines extending in the direction of the horizontal axis are marked off into several lengths with reference numerals or characters. These lengths represent the delay times of signals, such as MOVE and TES, indicated on the left-hand side in elements designated by reference numerals or characters such as 36, B and 22. The delay of the memory element in the memory unit 2 is about 60 ns from the clock signal CLK and the delays of the other component circuits are determined according to those of Schottky TTL elements. The bus B is typically a mother board wiring plate about 50 cm long.

FIG. 2C shows the arrangement of the transfer abnormality check circuit 11 in more detail. In FIG. 2C, reference numerals 111 and 113 designate a data parity check circuit for the higher byte and a data parity check circuit for the lower byte, respectively, of a data word, and 113 designates an OR gate. Data delivered from the receiver 12 is subjected to odd-number parity checking by the data parity check circuits 111 and 112. If any parity error is found, a signal indicating this fact is applied through the OR gate 113 to the transfer abnormality signal transmission drive 13.

FIG. 2D shows the arrangement of the transfer control circuit 31 in more detail. In FIG. 2D, reference numeral 311 designates an inverter, 312 and 313 flip-flops, and 314 and 315 AND gates. The operation of the circuit shown in FIGS. 1A and 2A will be described with reference to FIGS. 1B, 2B, 2C and 2D.

It is assumed that the data processing unit $3_i$ has delivered a bus B request signal $BRQ_i$ to the bus controller 1 with the timing $T_1$ in response to a transfer request signal A. The use request signal is stored in the flip-flop 312.

Among the request signal $BRQ_i$ and the request signals outputted by the other data processing units, the one of highest priority is selected by the bus controller 1. If the request signal $BRQ_i$ is highest in priority, the bus controller 1 applies a bus use permission signal $GRT_i$ to the data processing unit $3_i$. As a result, the flip-flop 312 is reset in synchronization with the synchronizing clock signal CLK while the flip-flop 212 is set. In response to the signal $GRT_i$, the data processing unit $3_i$ starts a data transfer operation and applies the signal MOVE, the signal DRCT according to the transfer direction signal B, and the address signal ADDRESS to the bus B.

When the data of an address in the memory unit 2 is read out and applied to the bus B, the data is loaded into a register (not shown) in the data processing unit $3_i$. At the same time, the data applied to the bus B is checked in the transfer abnormality check circuit 11 of the bus controller 1. The check can be carried out by a variety of checking methods. However, in the embodiment described, a parity check is employed. If the data is found to be abnormal, the transfer abnormality signal TES is applied to the bus B.

In the data processing unit $3_i$, the transfer abnormality signal TES is applied to the flip-flop 34 with the timing $T_2$ whereupon a transfer abnormality processing signal C is outputted so as to be used for the following data processing. The flip-flop 34 is reset by a transfer abnormality reset signal D.

As is apparent from the above description, if it is requested merely to transfer data at the point A (FIG. 2B) where the previous data transfer has been completed, the transfer of the next data can be started. However, if the transfer abnormality processing operation is carried out, then the next data transfer starting time instant is delayed to the point B. Thus, disadvantageously, the data transfer time is increased as a whole. For instance, at the point A in FIG. 2B the data transfer time is 200 ns, but at the point B the data trasfer time is increased by 25% to 250 ns. This causes no serious problem for a memory which has a relatively long access time. However, the above-described time delay will greatly affect a memory such as some types of semiconductor memories and especially an LSI memory whose operating speed is considerably fast, for example, 50 ns.

SUMMARY OF THE INVENTION

In view of the foregoing, an object of the invention is to provide a processing system of this type in which data is transferred always at a high speed.

In accordance with the invention, a data processing system is provided in which data is transferred under the control of a bus controller, and in which transmission of a transfer abnormality signal representing a data transfer abnormality is not carried out in the cycle in which data is transferred but instead is carried out in the next cycle, whereby the data transferring time is decreased making it possible to transfer data at higher average speeds.

BRIEF DESCRIPTION OF THE DRAWINGS

FIG. 3B is a timing chart for a description of the operation of a circuit shown in FIG. 3A.

DESCRIPTION OF THE PREFERRED EMBODIMENTS

A preferred embodiment of the invention will be described with reference to FIGS. 3A and 3B.

Figure 1A:
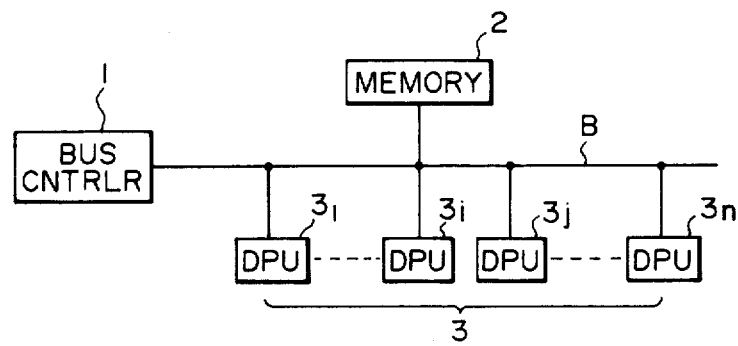
FIG. 1A is a connection diagram outlining a conventional data processing system.
Figure 1B:
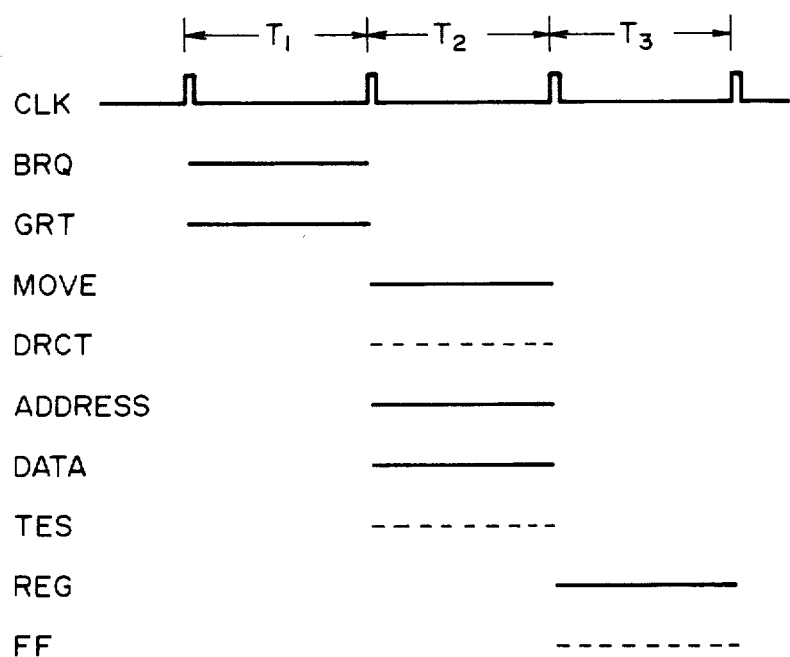
FIG. 1B is a timing chart for a description of the operation of the system in FIG. 1A.
Figure 2A:
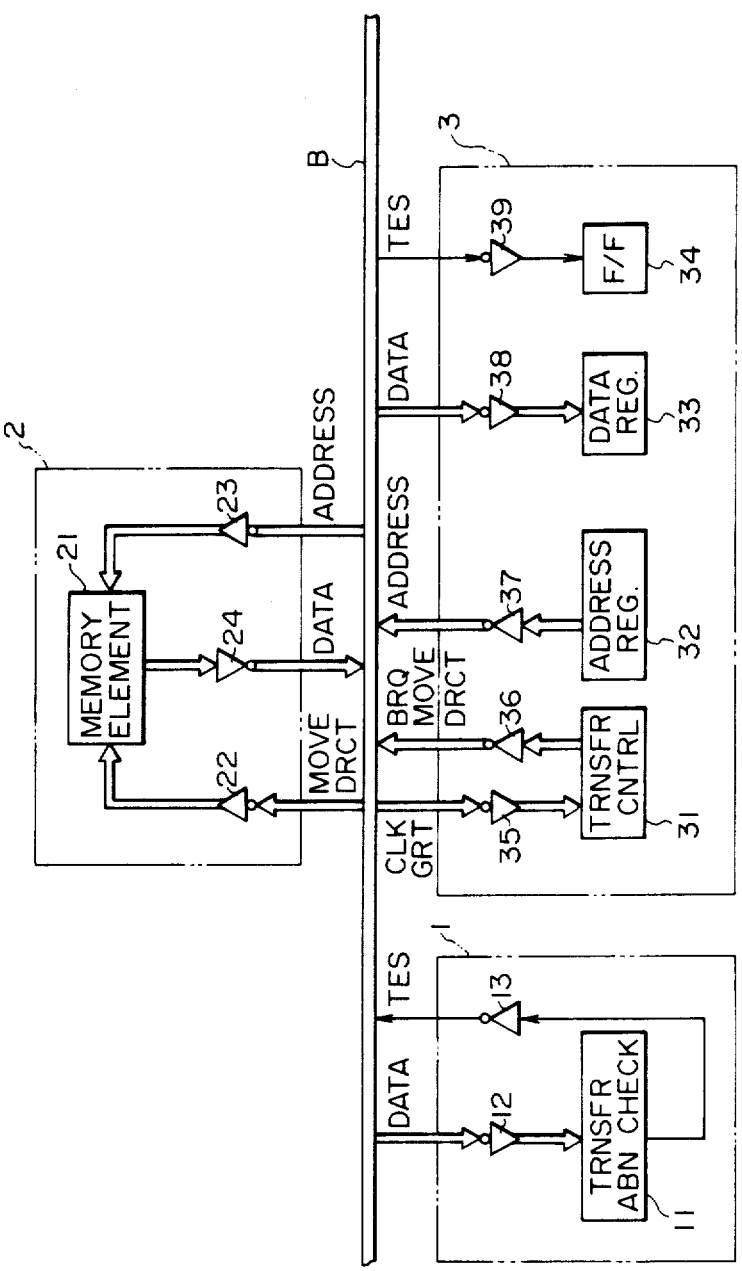
FIG. 2A is a connection diagram showing the system in FIG. 1A in more detail.
Figure 2B:
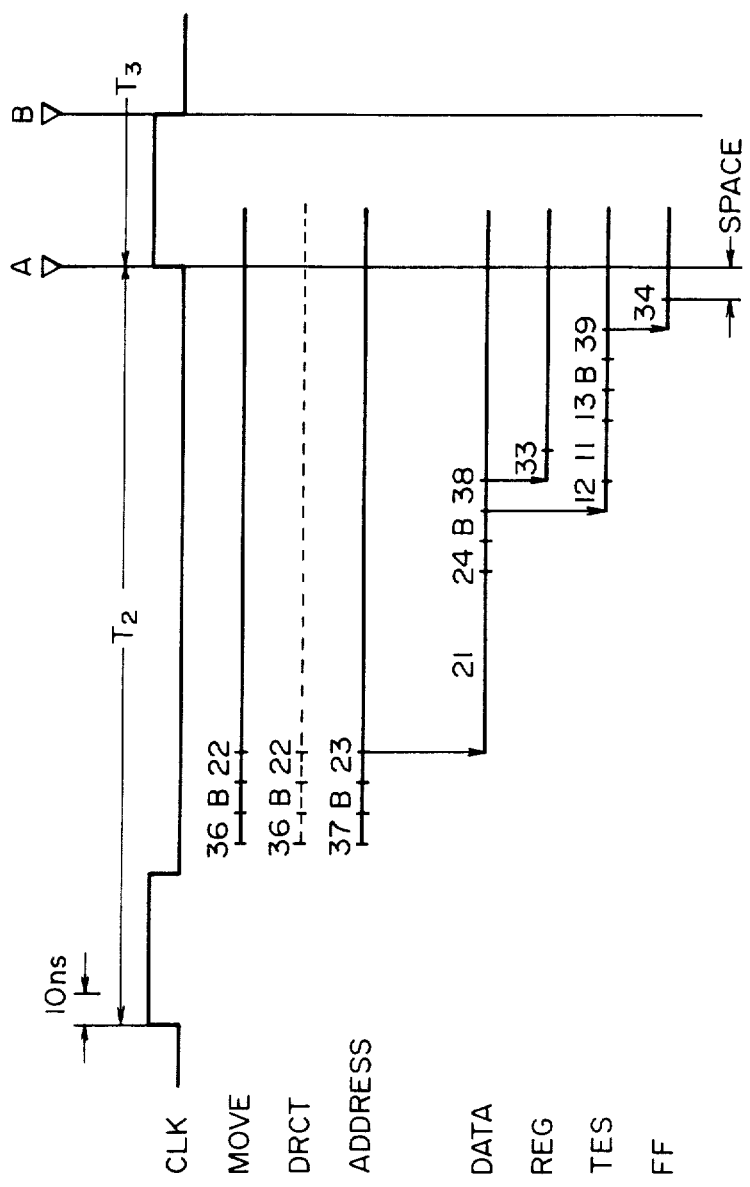
FIG. 2B is a timing chart showing a part of FIG. 1B in more detail.
Figure 2C:
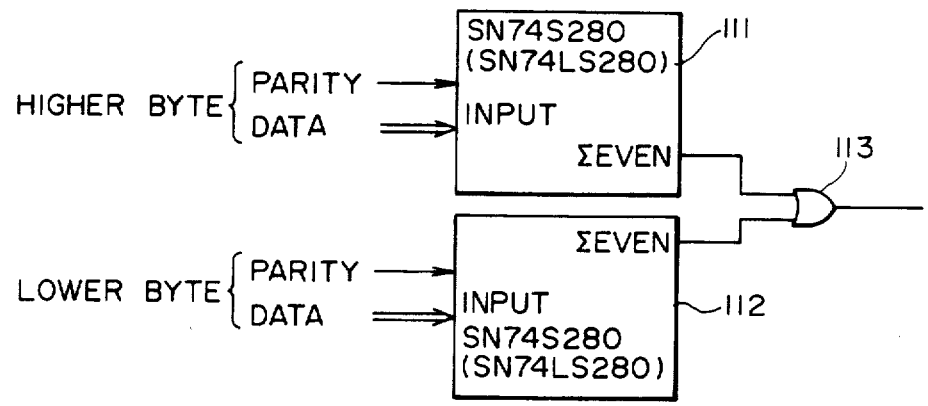
FIG. 2C is a circuit diagram, partly as a block diagram, showing the arrangement of a transfer abnormality check circuit in FIG. 2A in detail.
Figure 2D:
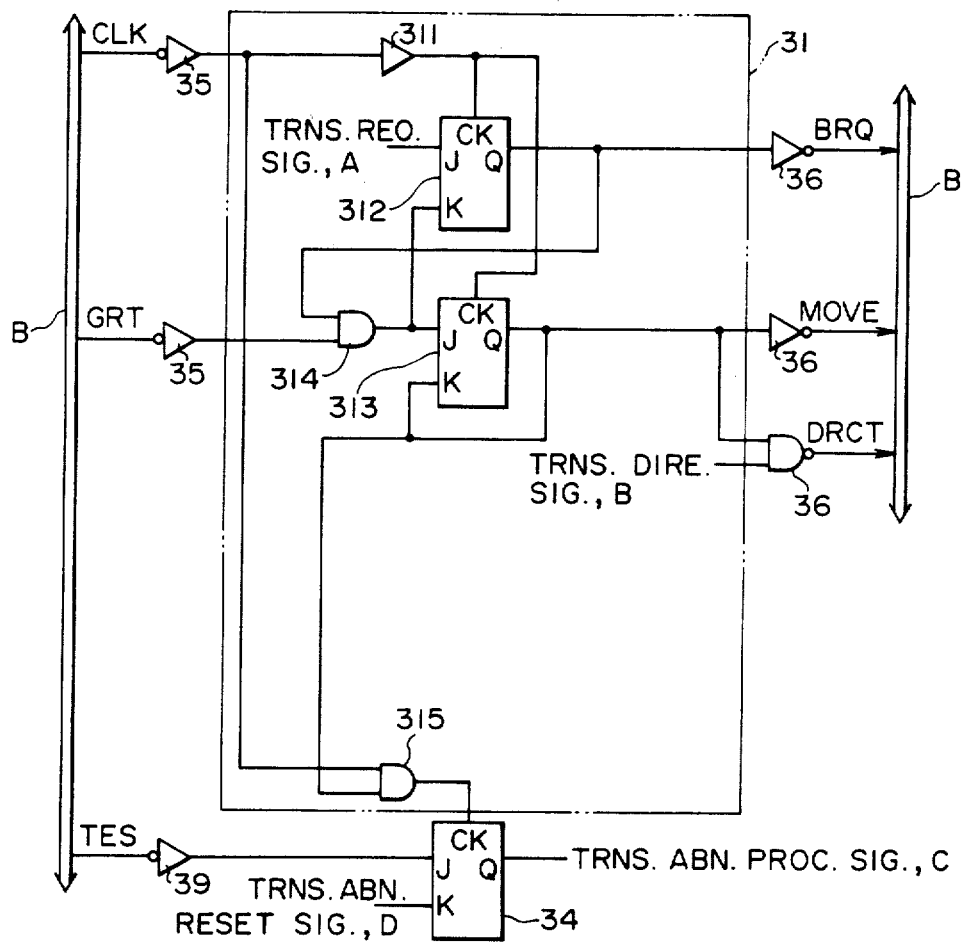
FIG. 2D is a circuit diagram, partly as a block diagram, showing the arrangement of a transfer control circuit in detail.
Figure 3A:
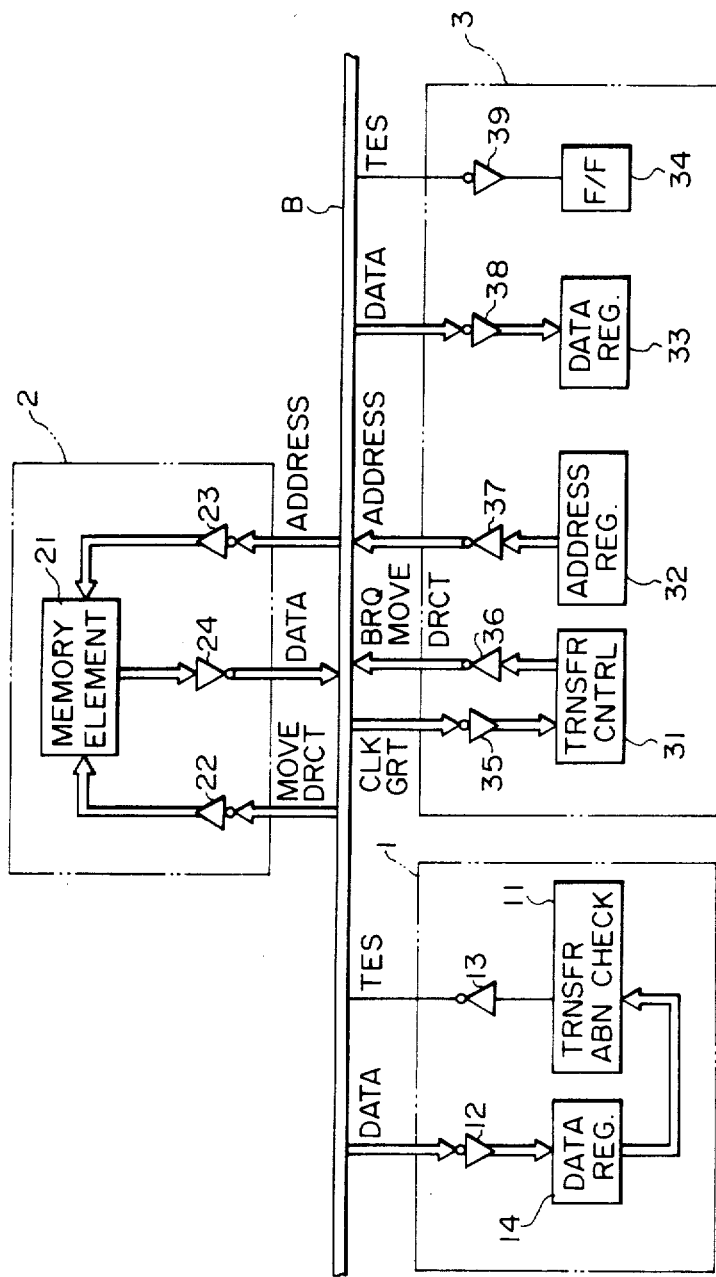
FIG. 3A is a circuit diagram, partly as a block diagram, showing a preferred embodiment of the data processing system of the invention.
Figure 3C:
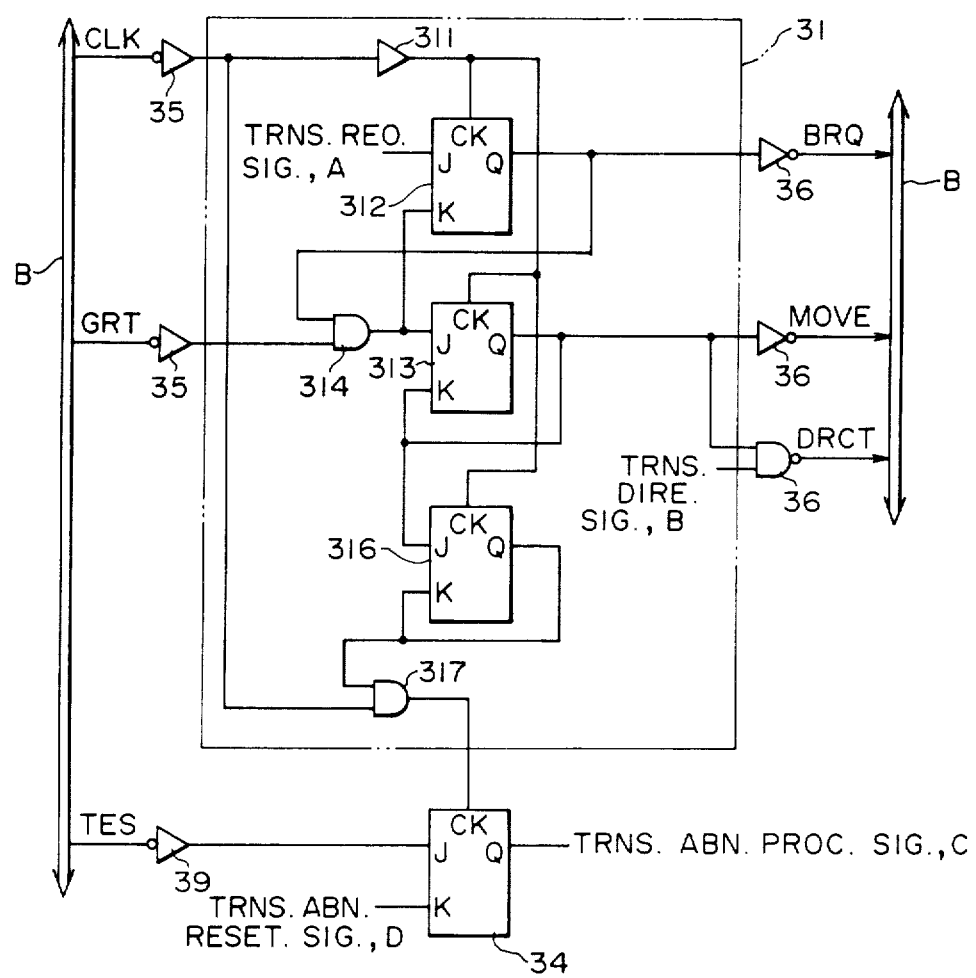
FIG. 3C is a circuit diagram, partly as a block diagram, showing the arrangement of a transfer control circuit in FIG. 3A in detail.

FIG. 3A is a connection diagram showing a preferred embodiment of the invention and FIG. 3B is a timing chart corresponding to the case where a data processing unit reads data out of a memory unit. Thus, FIGS. 3A and 3B correspond to FIGS. 2A and 2B, respectively. Therefore, only the arrangement and operation of the circuit shown in FIG. 3 which are different from those of the circuit shown in FIG. 2 will be described. FIG. 3C shows the arrangement of a transfer control circuit 31 of the invention in more detail corresponding to FIG. 2D. As is apparent from a comparison of FIG. 3C with FIG. 2D, the former differs from the latter in that a flip-flop 316 is provided to control an AND gate 317.

Another significant difference of the circuit in FIG. 3A from that in FIG. 2A is that a data register 14 for storing transferred data is provided between the receiver 12 of the bus controller 1 and the transfer abnormality check circuit 11.

The data register 14 takes in transfer data on the bus B with completely the same timing as the data register 33 of the data processing unit 3, i.e. at the time instant S. On the other hand, the transfer abnormality check circuit 11 is operated after the time instant S when data is set in the data register 14. In order to perform the abnormality processing operation with a delay of one cycle, the flip-flop 316 is set by the synchronizing clock signal CLK at the timing $T_3$, and upon transfer of the transfer abnormality signal TES the flip-flop 34 is set. Thus, the abnormality processing operation of the data transfer operation, which in the prior art system was carried out during the time $T_2$, is carried out in the time $T_3$ which is later by one cycle than $T_2$.

Accordingly, although the transfer abnormality processing operation is carried out similarly as in the prior art, the period of time required for the transfer abnormality processing operation can be neglected when compared with the total data transferring time. Therefore the data is transferred at a high average speed.

In the above-described embodiment, only a data parity check is employed in the data transfer. However, an address parity check, a region infringement check and an unloaded region access check can be similarly carried out by modifying the transfer abnormality check circuit 11 suitably.

In the above-described embodiment, a synchronous system in which data transfer is carried out with a clock signal is employed. However, an asynchronous system provided by the memory unit (which is, in general, a slave unit in a master and slave unit arrangement) may be utilized for transferring data.

As described above, in accordance with the invention, the data transferring operation is completely separated from the transfer abnormality processing operation, and the transfer abnormality processing operation is carried out one cycle after the data transfer operation. Therefore, the data transferring time is determined only by the data transferring operation. Thus, the invention is advantageous in that data can be transferred at high speed.

Furthermore, as a sufficiently long period of time is provided for the transfer abnormality processing operation in the invention, the limitation of the circuit construction that high speed logic elements such as Schottky TTL elements must be used is eliminated. Thus, the invention is advantageous in that low power Schottky TTL elements can be used.

The circuit for practicing the data transfer abnormality processing system of the invention can be formed by adding only a data register and control circuits to the conventional structure. Accordingly, the manufacturing cost is increased very little by the addition of such circuit elements.

The invention is applicable not only to a data transferring operation according to a bus system, but also to a 1:1 or 1:N data transferring operation. Therefore, the technical concept of the invention can be applied to a variety of systems having data signal lines and a transfer abnormality signal line.

What is claimed is:

1. A data processing system comprising: a memory unit; at least one data processing unit; a common bus having a plurality of data lines and a transfer abnormality signal line indicative of transferred data being abnormal; a bus controller coupled to said common bus, data being transferred between said memory unit and said at least one data processing unit and/or between data processing units through said common bus under control of said bus controller in transfer cycle periods, said bus controller comprising means for producing a transfer abnormality signal corresponding to data transferred in a first cycle period during a second cycle period immediately subsequent said first cycle period, wherein a time between adjacent cycle periods is substantially unaffected by said transfer abnormality signal, wherein said means for producing said transfer abnormality signal comprises a data register for receiving data from said common bus and a transfer abnormality check circuit having data inputs coupled to data outputs of said data register, said data register delaying the application of data from said common bus to said transfer abnormality check circuit by one cycle period.

2. The data processing system of claim 1 wherein said at least one data processing unit comprises a transfer abnormality setting flip-flop receiving a transfer abnormality signal on said transfer abnormality signal line from said transfer abnormality check circuit and means for applying a clock pulse to operate said transfer abnormality flip-flop one cycle period subsequent to application to said data processing unit of a bus use permission signal.

3. A data processing system comprising: a memory unit; at least one data processing unit; a bus controller; and a common bus, said bus controller, said memory unit, and said at least one data processing unit being connected in parallel on said common bus; said common bus including a data transfer abnormality signal line; said bus controller controlling transfer of data between said memory unit and said at least one data processing unit and/or between data processing units; said bus controller operating to transfer data in predetermined cycle periods; said bus controller comprising a data register coupled to receive data from said common bus; and a transfer abnormality check circuit for receiving output data from said data register; said transfer abnormality check circuit producing a transfer abnormality signal coupled over said transfer abnormality signal line of said common bus to a transfer abnormality register; a transfer abnormality signal corresponding to a first cycle period being produced on said transfer abnormality signal line in a second cycle period immediately subsequent to said first cycle period.

4. The data processing system of claim 3 wherein said at least one data processing unit comprises a transfer abnormality flip-flop, being said transfer abnormality register having a data input coupled to receive said transfer abnormality signal from said transfer abnormality signal line of said common bus, wherein said bus controller produces a line use permission signal upon said common bus, said line use permission signal being coupled to said at least one data processing unit, and wherein said data processing unit further comprises a second flip-flop for registering said data use permission signal; a third flip-flop having a data input coupled to an output of said second flip-flop for delaying said output of said second flip-flop by one cycle period; and an AND gate having a first input coupled to an output of said third flip-flop and a second input coupled to receive clock pulses from said common bus, an output of said AND gate being coupled to a clock input of said transfer abnormality setting flip-flop.

5. The data processing system of claim 3 or 4 wherein said transfer abnormality check circuit comprises a parity check circuit.

* * * * *